United States Patent [19]
Dragotin

[11] Patent Number: 5,146,478
[45] Date of Patent: Sep. 8, 1992

[54] METHOD AND APPARATUS FOR RECEIVING A BINARY DIGITAL SIGNAL

[75] Inventor: Alexander Dragotin, Puchheim, Fed. Rep. of Germany

[73] Assignee: Siemens Aktiengesellschaft, Munich, Fed. Rep. of Germany

[21] Appl. No.: 500,914

[22] Filed: Mar. 29, 1990

[30] Foreign Application Priority Data

May 29, 1989 [DE] Fed. Rep. of Germany ....... 3917426

[51] Int. Cl.$^5$ .............................................. H04L 7/02
[52] U.S. Cl. ................................... 375/119; 328/155
[58] Field of Search ............... 374/118, 119, 106, 110, 374/111; 328/55, 155; 307/601, 602, 603

[56] References Cited

U.S. PATENT DOCUMENTS 4,320,525  3/1982  Woodward .................... 375/110
4,821,296  4/1989  Cordell ........................ 375/119

FOREIGN PATENT DOCUMENTS 0168330  1/1986  European Pat. Off. .
0363513  4/1990  European Pat. Off. .
3441501  5/1986  Fed. Rep. of Germany .

Primary Examiner—Benedict V. Safourek
Attorney, Agent, or Firm—Hill, Van Santen, Steadman & Simpson

[57] ABSTRACT

The reception of the binary digital signal that may also have phase shifts should be accomplished with a supplied clock that has an arbitrary phase relation compared to the digital signal and can deviate somewhat in frequency from the bit repetition rate of the digital signal. In the disclosed structure, the digital signal is delayed in a delay chain such that a sequence of digital signals having identical phase spacings arises and pulses are derived from the edges thereof. Query pulses are generated from the leading or trailing edges of a clock, the query pulses being operated with the pulses generated from the digital signals through AND gates. In a following, further AND gate, each output signal of one of the AND gates is through-connected to an OR gate. The output of the OR gate is sampled with delayed query pulses in a D flip-flop such that the sampling occurs approximately one-fourth of a clock period following the effective edge of the output signal.

19 Claims, 7 Drawing Sheets

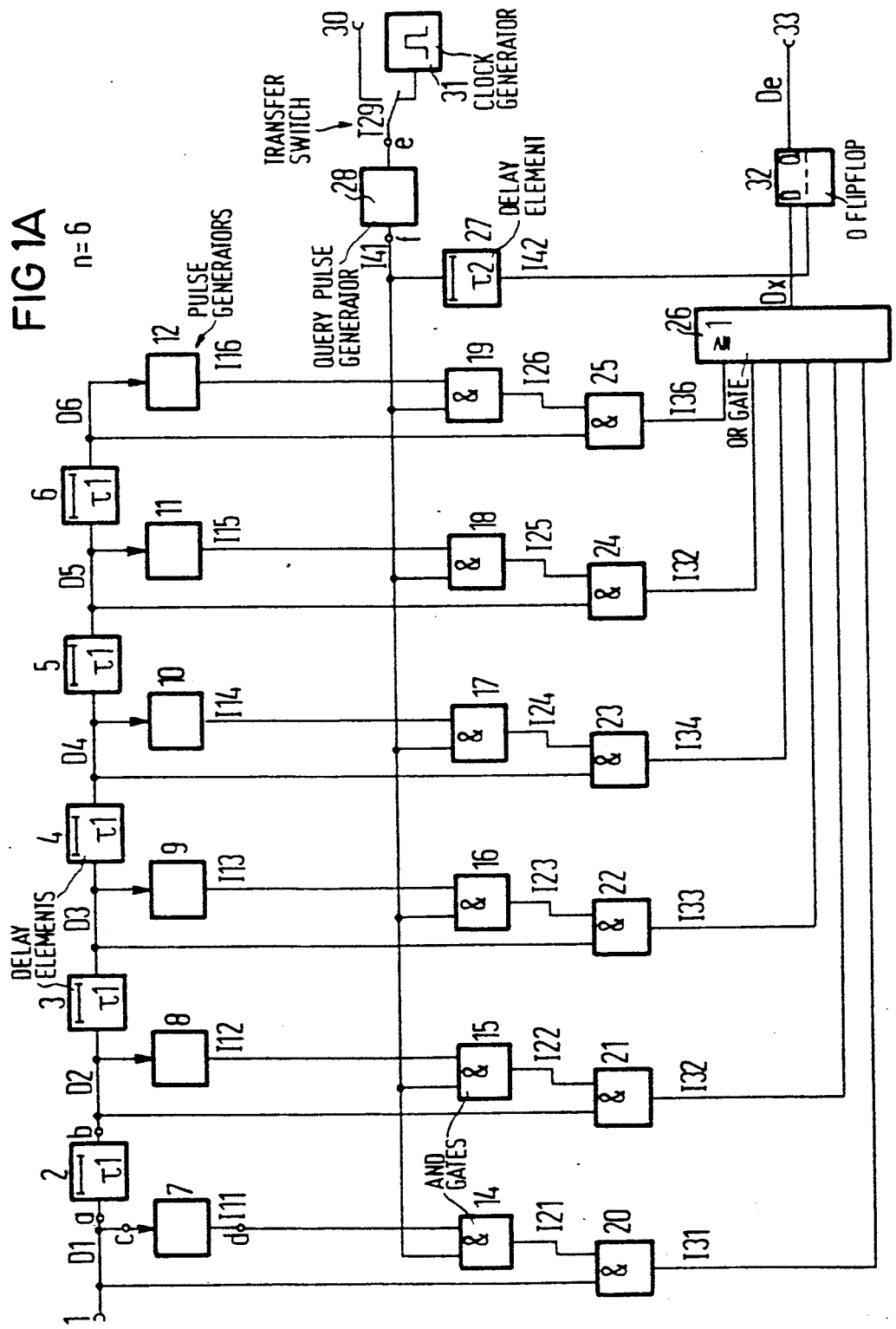

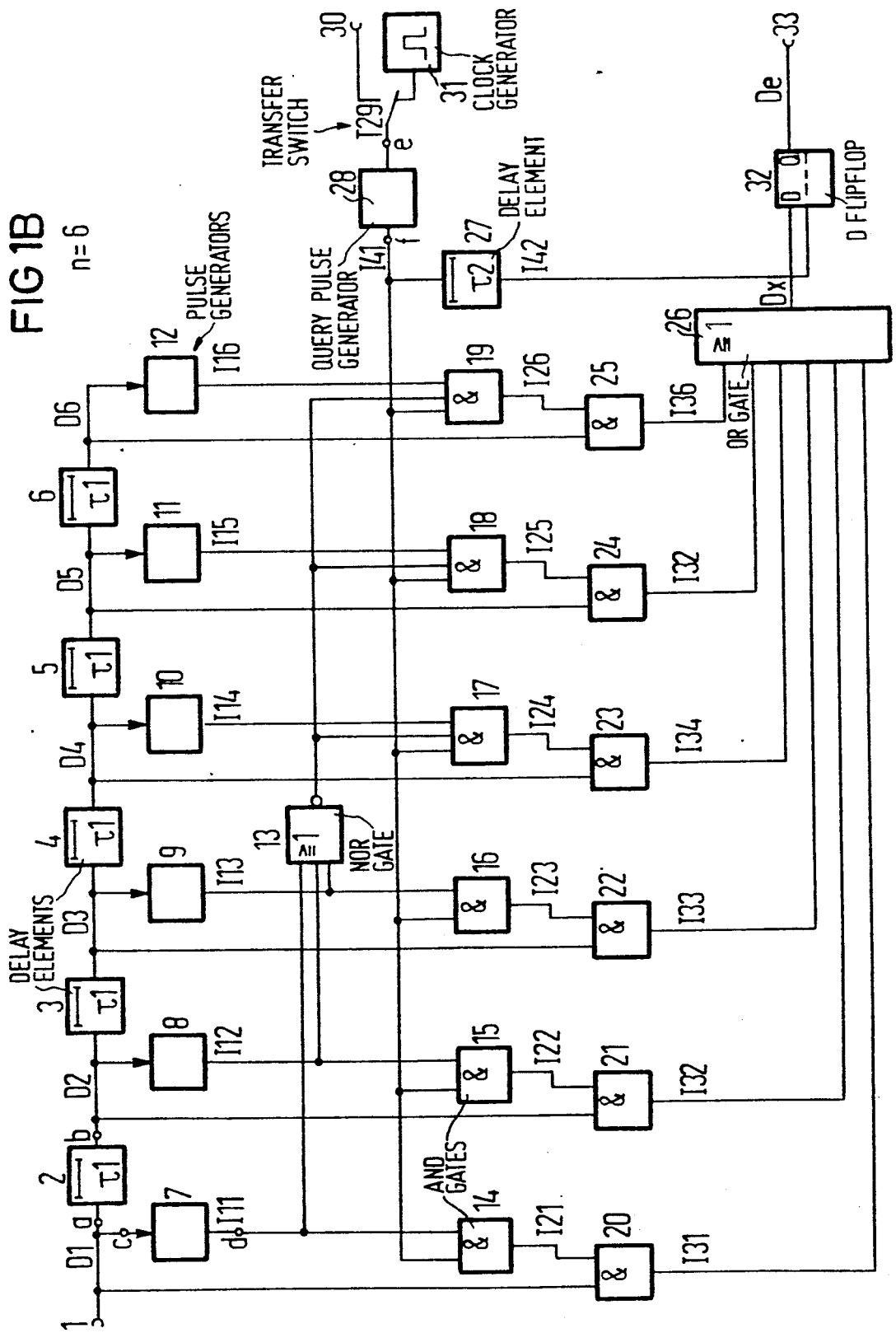
FIG 1B n=6

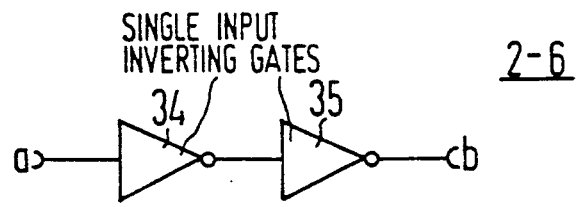
FIG 2
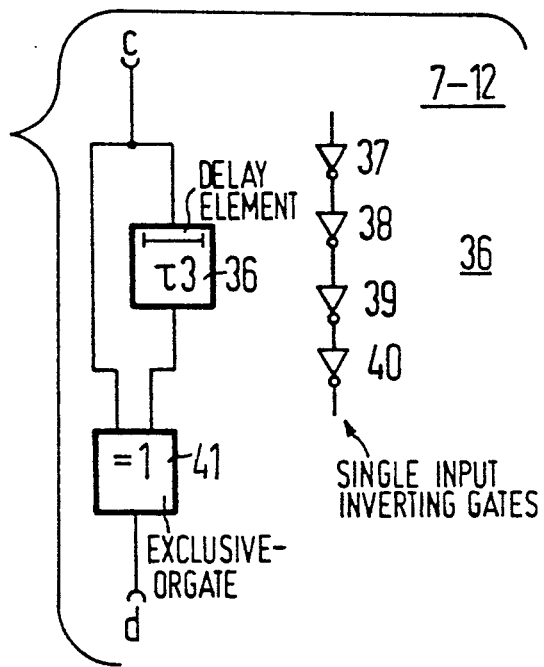
FIG 3
FIG 4
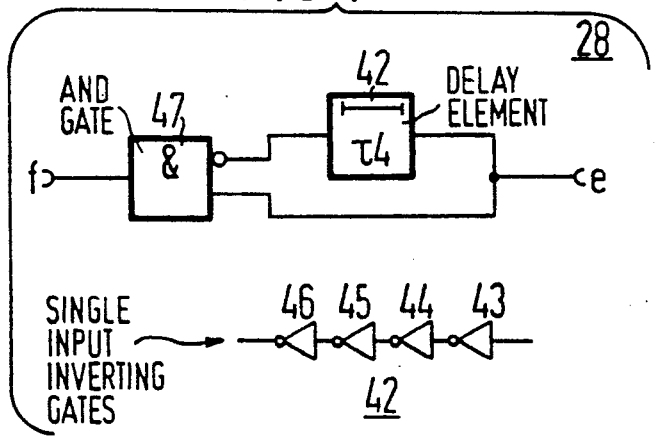

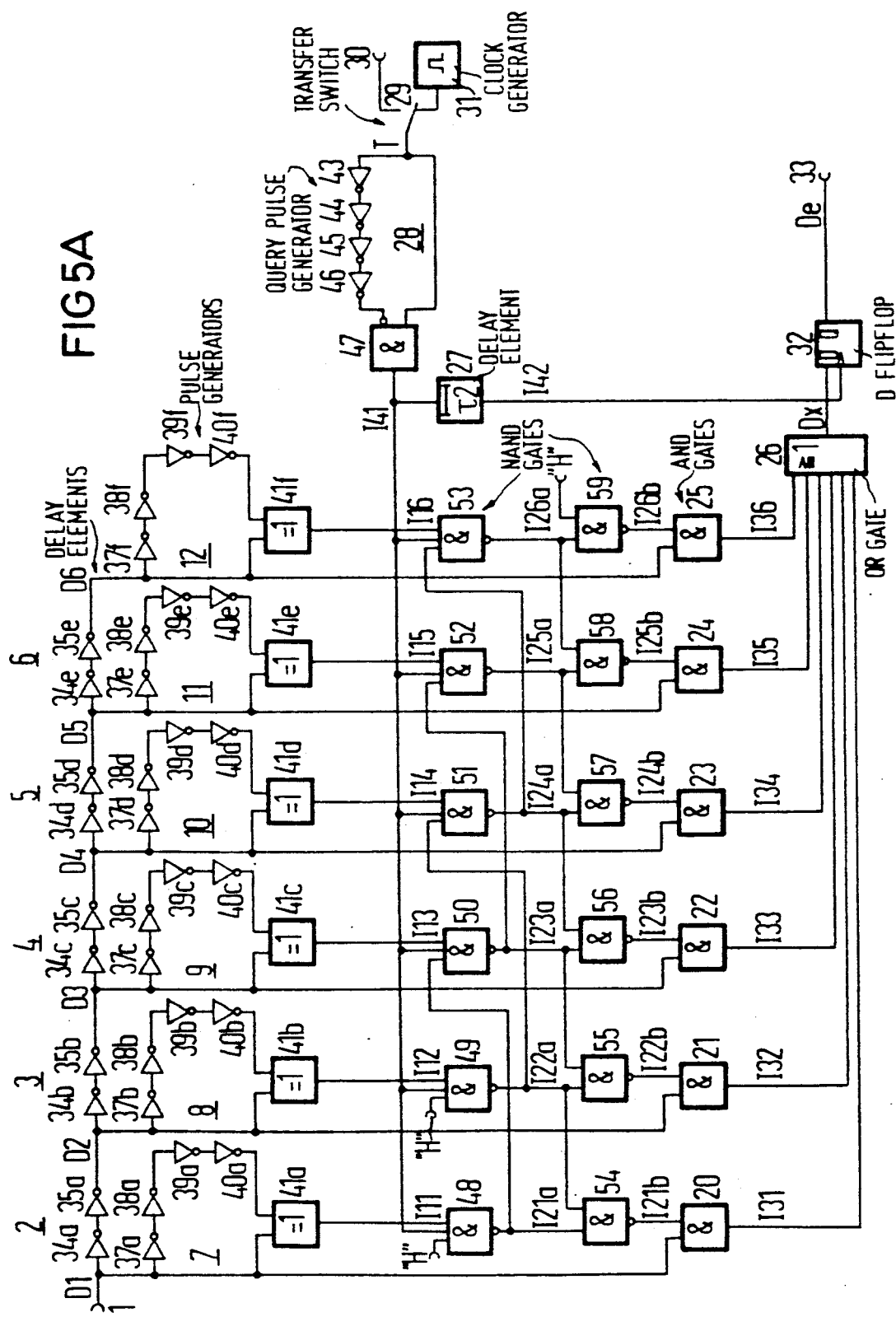

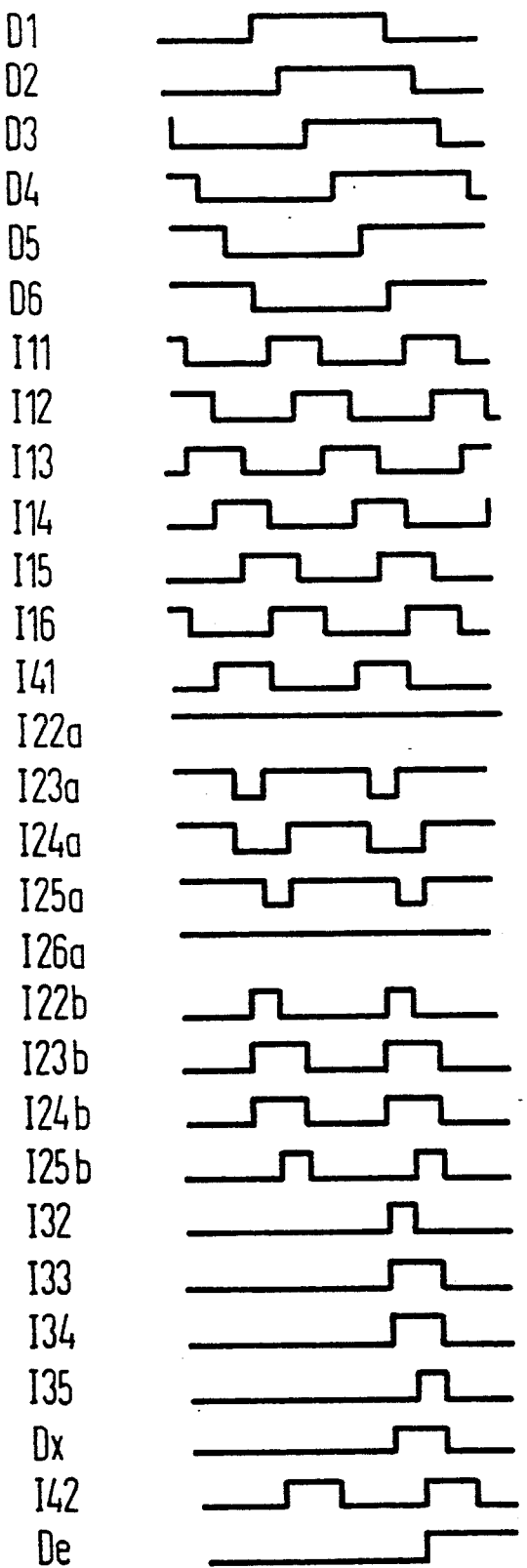

METHOD AND APPARATUS FOR RECEIVING A BINARY DIGITAL SIGNAL

BACKGROUND OF THE INVENTION

1. Field of the Invention

The present invention relates to a method and to an arrangement for receiving a binary digital signal that may also have phase shifts, utilizing a clock whose frequency is identical to or plesiochronic with the bit rate of the digital signal and whose phase difference compared to this digital signal is arbitrary.

2. Description of the Prior Art

The German published application Ser. No. 34 41 501 A1 discloses a circuit arrangement for recognizing and synchronizing a digital signal that compensates phase fluctuations of the incoming signal bits. To that end, it contains a series circuit of a controllable delay line and a decision logic circuit. The former is connected to a delay control unit via address lines and the latter is connected to the delay control unit via control lines. The decision logic circuit is supplied with a system clock via a clock line, the frequency of the system clock corresponding to the bit rate of the digital signal that is to be regenerated and synchronized.

In an ideal, binary digital signal, the leading and trailing edges lie in a fixed grid that is prescribed by the period of the clock frequency. Each deviation of edges from this grid is referred to as jitter. With defined limits, this dare not lead to an information error upon reception.

Two fundamental types of jitter can be distinguished. The first relates to deviations of the times of two successive edges from the prescribed grid; the second relates to phase shifts that build up slowly and that lead to a time shift of more than one period.

In accordance with an earlier proposal U.S. Ser. No. 07/417,150, now U.S. Pat. No. 5,003,561, a sequence of clocks that have approximately identical phase spacings is formed from a clock by way of a delay chain. Short pulses are derived from these clocks. A query pulse that can also be delayed is derived upon the arrival of each edge of a digital signal selected as effective, a presence of pulses being queried with this query pulse via AND gates. By way of set-reset SR flip-flops and AND gates, clocks selected with existing pulses are connected through and, OR operated, are employed as read-in clocks. The overall operating time of these method steps may possibly be dimensioned by the delay of the query pulse such that the effective edge of the read-in clock always appears half a clock period following the effective edge of the digital signal. What is referred to as an effective edge is an edge serving for the derivation of pulses.

SUMMARY OF THE INVENTION

The object of the present invention is to provide a further method for inertia-free reception of a binary digital signal with changing phase relations.

Proceeding from a method of the type set forth above, this object is achieved, according to the present invention in a method for receiving a binary digital signal that may also have phase shifts, utilizing a clock whose frequency is identical to or plesiochronic with the bit rate of the digital signal and whose phase difference compared to the digital signal is arbitrary, and is particularly characterized in that query pulses are derived from the leading edges or the trailing edges of the clock, the duration of the query pulses being short in comparison to the clock periods, but long enough that logic elements can be driven therewith, and their duration being longer than the setting and holding times of D flip-flops plus the time interval of the pulse duration distortion of the digital signals during the implementation of the method, in that n-1 for the digital signals are derived from the first digital signal on the basis of delay with n-1 (n>3) approximately identical first delay times ($\tau1$) given an overall delay time of at least one clock period and less than two clock periods, in that respective pulses are derived from the leading and trailing edges of all digital signals, at least one of the respective pulses appearing during the full duration of a query pulse and the duration of these respective pulses being short in comparison to the clock period, no longer than the first delay time ($\tau1$) and, given high values of n, long enough that logic elements can be driven therewith, in that the query pulses are separately AND operated with each simultaneously appearing pulse, in that the signals arising from this AND operation through connect the allocated digital signals via further AND operations, in that the through-connected digital signals are OR operated, and in that the internal digital signal deriving from the OR operation is sampled with the query pulses for acquiring the receiving digital signal after the query pulses have been optimally delayed with a second delay time ($\tau2$) that the sampling occurs approximately one-fourth of a clock period following the effective edge of the internal digital signal When the delay of the delay chain is longer than the clock period, the method is particularly characterized in that the approximately first half of the pulses with respect to the delay are NOR operated, and in that the signal deriving from the NOR operation is involved in the AND operation of the remaining pulses with the query pulses, this preventing a through-connection of two digital signals that are not neighbors.

An arrangement for implementing the methods set forth above is particularly characterized in that a delay chain of n-1 first delay elements having a first delay time ($\tau1$) is provided that serves for the derivation of n-1 delayed digital signals from the digital signal at the input, in that one of n pulse generators is connected to this input and to the output of each delay element, the pulse generators deriving pulses from the digital signals, in that a query pulse generator for the derivation of query pulses from a clock is provided, in that n first AND gates are provided whose first input is connected to the output of a respective one of the pulse generators and whose second input is connected to the output of the query pulse generator, in that n second AND gates are provided whose first input is connected to the input or, respectively, to the output of a respective delay element and whose second input is connected to the output of a respective one of the first AND gates, in that an OR gate is provided whose inputs are connected to the output of a respective one of the second AND gates, and in that a second delay element having a second delay time ($\tau2$) is provided that is connected to the output of the query pulse generator, and in that a D flip-flop is provided whose D input is connected to the output of the OR gate, whose clock input is connected to the output of the second delay element and whose Q output is connected to the output for the received digital signal.

According to another feature of the invention, the arrangement is particularly characterized in that an AND gates is provided in the query pulse generator, the first non-inverting input thereof being connected to the input of the query pulse generator, the second, inverting input thereof being connected via a fourth delay element having a fourth delay time ($\tau 4$) to the input of the query pulse generator and the output thereof being connected to the output of the query pulse generator.

According to another feature of the invention, the arrangement is particularly characterized in that series circuits of gates are provided as delay elements to establish the delay times $\tau 1 - \tau 4$.

According to another feature of the invention, the arrangement is particularly characterized in that the first delay elements at least partially simultaneously serve as third delay elements in that the second input of each EXCLUSIVE-OR gate is connected to the output of the first delay element lying immediately thereafter.

According to another feature of the invention, the arrangement is particularly characterized in that the first AND gates are replaced by first NAND gates whose first input is connected to the output of a respective one of the pulse generators, whose second input is connected to the output of the query pulse generator and whose third input is connected to that respective first NAND gate that precedes or, if not present, is connected to a logical "H", and replaced by a second NAND gate whose first input is connected to the output of the identically-disposed first NAND gate, whose second input is connected to the first input of the following, second NAND gates and whose output is connected to the second input of the second, identically-disposed AND gate.

The method of the present invention can be utilized in synchronously-operating equipment. A faultless reception of the digital signals is thereby enabled by compensating an arbitrary phase relation. This method works like clock recovery.

A further possible application is a block switching wherein a synchronization of the clock frequencies is not necessary. The method can be applied in order to compensate a phase that continuously changes because of the clock frequency differences. However, it can also be used when the various information blocks have different phase relations.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1A is a schematic representation of an arrangement constructed and operating in accordance with the present invention;

FIG. 1B is a schematic representation of another arrangement constructed and operated in accordance with the present invention;

FIG. 2 is a schematic circuit diagram of a delay element;

FIG. 3 is a schematic circuit diagram of a pulse generator;

FIG. 4 is a schematic circuit diagram of a query pulse generator;

FIG. 5 is a schematic representation of the arrangement of FIG. 1 in greater detail;

FIG. 6 is a pulse diagram as an aid for explaining the operation of the circuit of FIG. 5;

DESCRIPTION OF THE PREFERRED EMBODIMENTS

Figure 5B:
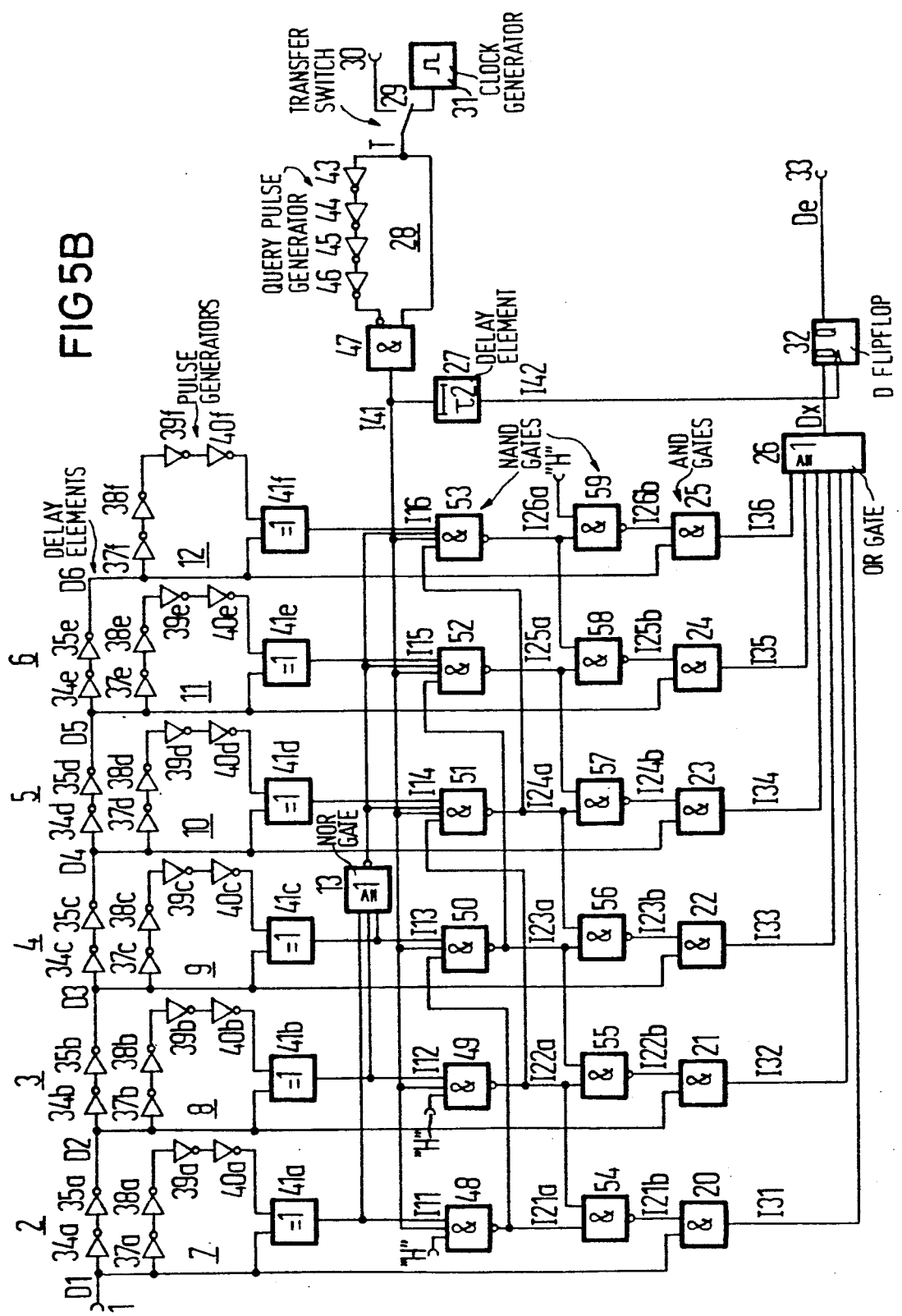
FIG. 5B is a schematic representation of the arrangement of FIG. 1B shown in greater detail.

Referring to FIG. 1, an arrangement constructed in accordance with the present invention is illustrated as comprising a plurality of delay elements 2-6 each having a delay time $\tau 1$, a plurality of pulse generators 7-12, a NOR gate 13, a plurality of AND gates 14-25, an OR gate 26, a delay element 27 having a delay time $\tau 2$, a query pulse generator 28, a transfer switch 29, a clock generator 31 and a D flip-flop 32. In practice, the plurality of delay elements having the delay time $\tau 1$ is usually greater.

A digital signal D1 is supplied to the input 1. A plurality of further digital signals D2-D6 are provided, with each delayed relative to the preceding digital signal by the interval $\tau 1$ after respective ones of the delay elements 2-6. Pulses I11-I16 are derived in a plurality of pulse generators 7-12 from the leading and trailing edges of the digital signals D1-D6.

A clock T is supplied to a query pulse generator 28 via the transfer switch 29, either from the exterior at the input 30 or from the clock generator 31.

In FIG. 1A the query pulses I41 are operated with the overlapping pulses I11-I16 in the AND gates 14-19. Insofar as there is a chronological overlap of the pulses I11-I16 with the query pulses I41, the pulse I21-I26 arise at the outputs of the AND gates 14-19. These are operated with the digital signals D1-D6 in the AND gates 20-25. When, for example, a pulse I24 appears, then the digital signal D4 is connected through via the AND gate 23 as a pulse I34 and proceeds to the OR gate 26 at whose output it appears as a selected digital signal Dx. The latter is supplied to the D input of the D flip-flop 32 at whose clock input the query pulses I42, delayed by the delay time $\tau 2$ in the delay element 27 are applied. The digital signal De that has now been received proceeds from the Q output of the D flip-flop 32 to the circuit output 33.

When the delay in the chain 2-6 is longer than the clock period of the digital signal D1, two pulses can appear, leaving overlaps out of consideration. When one of the pulses I11-I13 appears, then the NOR gate 13 effects that an operation is no longer possible in the AND gates 17-19 as illustrated in FIG. 1B.

FIG. 2 illustrates an exemplary embodiment of one of the delay elements 2-6. It contains gates 34 and 35 for acquiring the delay whose delays yield the overall delay $\tau 1$. This delay element can be introduced between the terminals a and b in FIG. 1.

FIG. 3 illustrates an exemplary embodiment of the pulse generators 7-12 with a delay element 36 having a delay $\tau 3$ and with an EXCLUSIVE-OR gate 41. The delay element 36 can be realized by a plurality of gates 37-40. The delay time $\tau 3$ here is selected equal to $2 \cdot \tau 1$. The EXCLUSIVE-OR gate 41 outputs a pulse I11-I16 as long as the pulse is applied at only one of its inputs.

This pulse generator can be introduced between the terminals c and d in FIG. 1.

FIG. 4 illustrates an exemplary embodiment of a query pulse generator 28 including a delay element 42 composed of four gates 43–46 having an overall delay τ4 and with an AND gate 47. This circuit outputs a pulse I41 as long as a logical "H" is applied at its non-inverting input and a logical "L" is applied at its inverting input. This query pulse generator 27 can be introduced between the terminal e and the terminal f in FIG. 1.

It should be noted that the elements 34, 36, 37, 38, 39, 40 and 43–46 have been illustrated as inverters and are here considered to be single-input inverting gates.

FIG. 5A illustrates a more detailed embodiment of the invention. In contrast to the arrangement of FIG. 1, the delay elements 2–6 are replaced by delay elements of the type illustrated in FIG. 2, the pulse generators 7–12 are replaced by pulse generators of the type illustrated in FIG. 3 and the query pulse generator 28 is replaced by a query pulse generator of the type illustrated in FIG. 4. Furthermore, NAND gates 48–59 are utilized instead of the AND gates 14–19 of FIG. 1.

FIG 5B corresponds to FIG. 1B with the same elements replaced as with respect to FIG. 5 and FIG. 1, and further, in the manner of FIG. 1B, illustrating the NOR gate 13 for inhibiting operation of the AND gates 17–19 in response to appearance of one of the pulses I11-I13.

FIG. 6 is a pulse diagram for explaining the operation of the arrangement of FIG. 5 and reference should also be taken thereto.

The digital signal D1 is delayed step-by-step by respectively two gate delay times in the delay chain 34a, 35a–34e, 35e, as a result whereof the digital signals D2–D6 arise. When the logical state of one of the digital signals D1–D6 changes at the input 1 or at an output of one of the double delay elements 34a, 35a–34e, 35e, a pulse that is four gate delay times long is formed by the appertaining EXCLUSIVE-OR gate. If it were the EXCLUSIVE-OR gate 41c, then a pulse I13 would arise with the assistance of the gates 37c–40c.

A pulse I41 that is four gate delay times long is formed from each positive edge of the clock T by the gates 43–46 and by the AND gate 47. When the pulse I41, for example, arrives at the input of the NAND gate 50 with the pulse I13 and with the output signal I21a of the NAND gate 48 that precedes in the transmission direction of the digital signal D1 respectively having the logical state "H", then the NAND operation 123a yields a state of logical "L" at the output of the NAND gate 50. The incorporation of the output signal of the preceding NAND gate effects a pulse shortening. When one of the pulses I21a–I26a has a logical state of "L", a state of logical "H" appears at the output of the appertaining NAND gate 54–59. The appertaining AND gate 20–25 can then through connect the corresponding digital signal.

Figure 7:
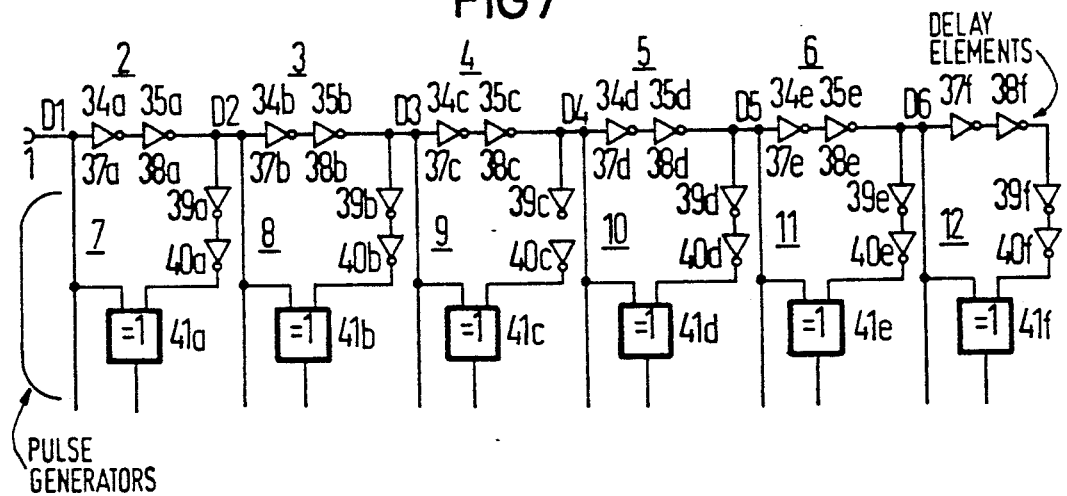
FIG. 7 is a schematic circuit diagram of a first alternative of a circuit portion of the arrangement of FIG. 5.
Figure 8:
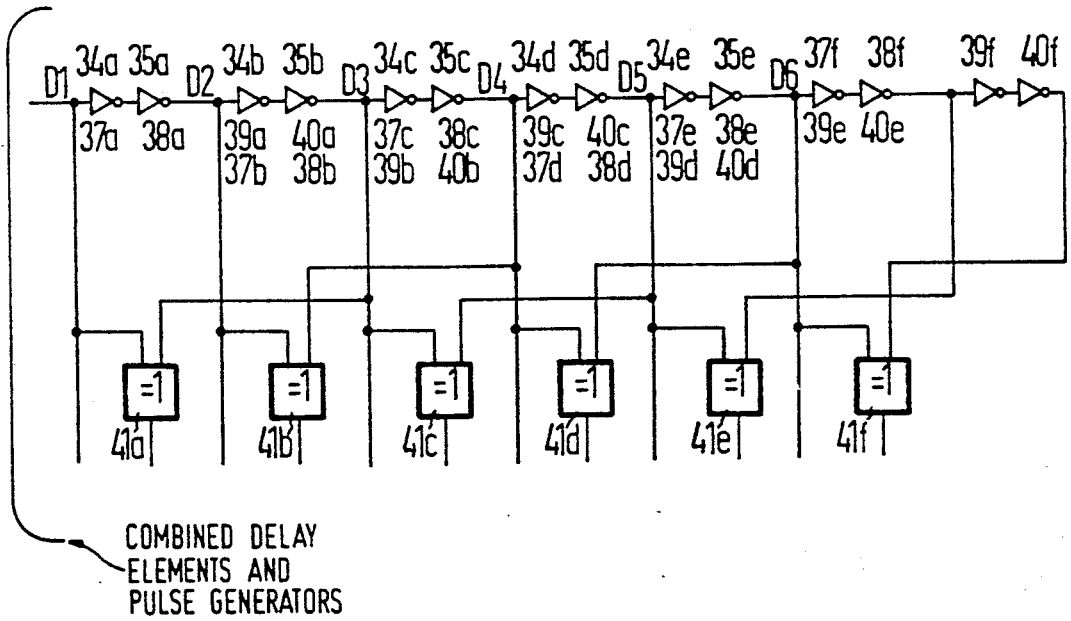
FIG. 8 is a schematic circuit diagram of a second alternative of a circuit portion of the arrangement of FIG. 5.

In FIG. 7, the gates 34a–34c and 35a–35e of FIG. 5 can simultaneously fulfill the job of the gates 37a–37e and 38a–38e, as the multiple reference characters indicate. The same holds true with respect to FIG. 8 in that the gates 34a, 35a, 34e, 35e can fulfill up to three jobs, thus decreasing the number of gates required from 34 down to 14.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for receiving a binary digital signal which may have phase shifts, using a clock whose frequency is identical to or plesiochronic with the bit rate of the digital signal and whose phase difference compared to the digital signal is arbitrary, comprising the steps of:

generating query pulses from the edges of the clock, the query pulses having a duration which is short in comparison to the clock period and longer than the setting and holding time of a D flip-flop plus the time interval of the pulse distortion duration of the digital signal during implementation of the method;

generating $n-1$ delayed digital signals on the basis of a delay wherein $n>3$ with approximately identical first delay times given an overall delay of at least one clock period and less than two clock periods;

generating delayed pulses from the leading and trailing edges of all the delayed digital signals such that at least one of the delayed pulses appears during the full duration of a query pulse and the delayed pulses being short in comparison to the clock period and longer than said first delay time;

first ANDing the query pulses separately with each simultaneously-appearing delayed pulse;

secondly, ANDing the results of the first ANDing the individual delayed digital signals to connect through the digital signals;

ORing the through-connected digital signals;

delaying the query pulses an optimal second delay time; and sampling the results of the ORing step with the delayed query pulses such that the sampling occurs approximately one-fourth of a clock period following an effective edge of the signal resulting from the ORing step.

2. The method of claim 1, and further defined by the step of:

NORing the approximately first half of the generated delay pulses; and applying the results of the NORing in the ANDing operations with respect to the remaining generated delayed pulses and the query pulses.

3. Apparatus for receiving a binary signal which may have phase shifts, comprising:

a signal input for receiving a binary digital signal;

a plurality of $n-1$ first delay elements connected in series and forming a delay line including a plurality of taps for providing an undelayed binary digital signal and $n-1$ delayed binary digital signals, each of said first delay elements having a first predetermined delay interval;

a plurality of n pulse generators each having an input and an output, said input of one of said pulse generators connected to said signal input which constitutes a tap for the undelayed binary digital signal and the inputs of the other pulse generators each connected to a respective one of said taps for receiving respective delayed binary digital signals, said pulse generators respectively operable to generate pulses in response to said undelayed and delayed binary digital signals;

a clock generator operable to produce a clock having a frequency that is identical to or plesiochronic with the bit rate of the received binary digital signal and a phase difference which is arbitrary compared to the received binary digital signal;

a query pulse generator including an input connected to said clock generator and including an output, said clock generator operable to produce query pulses in response to the clock;

a plurality of n first AND gates including a plurality of inputs and an output, a first of said inputs connected to said output of a respective pulse generator and a second of said inputs connected to said output of said query pulse generator;

a plurality of n second AND gates each including first and second inputs and an output, said first input connected to a respective tap of said delay line for receiving respective ones of the delayed binary digital signals with one of said first inputs connected to said signal input for receiving the undelayed binary digital signal, said second input connected to said output of a respective first AND gate;

an OR gate including a plurality of inputs each connected to said output of a respective second AND gate, and an output;

a second delay element having a second delay interval which is twice the delay of said first delay interval and including an input connected to said output of said query pulse generator and an output;

a received digital signal output; and a D flip-flop including a D input connected to said output of said OR gate, a clock input connected to said output of said second delay element, and an output connected to said received digital signal output.

4. The apparatus of claim 3, and further comprising:

a NOR gate including a plurality of inputs each connected to said output of a respective pulse generator of approximately the first half of said n−1 pulse generators with respect to the delay of said binary digital signal by said delay line, and an output; and each of said first AND gates whose first input is connected to said output of one of the remaining approximately half of said n−1 pulse generators including a third input connected to said output of said NOR gate to inhibit through connection to said OR gate.

5. The apparatus of claim 3, wherein each of said pulse generators comprises:

an EXCLUSIVE-OR gate including first and second inputs and an output, said first input constituting said input of said pulse generator, and said output constituting said output of said pulse generator; and a third delay element having a third delay interval and including an input connected in common with said first input of said EXCLUSIVE-OR gate and an output connected to said second input of said EXCLUSIVE-OR gate.

6. The apparatus of claim 3, wherein said query pulse generator comprises:

a third AND gate including a non-inverting input constituting said input of said query pulse generator, an inverting input, and an output constituting said output of said query pulse generator; and a further delay element having a delay time greater than said first predetermined delay interval and including an input connected in common with said non-inverting input of said third AND gate, and an output connected to said inverting input of said third AND gate.

7. The apparatus of claim 3, wherein:

each of said first delay elements comprises a plurality of single-input gates connected in series; and each of said pulse generators comprises an EXCLUSIVE-OR gate including a first input constituting said input of said pulse generator, a second input, and an output constituting said output of said pulse generator, and a third delay element including an input, an output, and a plurality of serially-connected single-input gates connected between said input and said output, said input connected in common with said first input of said EXCLUSIVE-OR gate, and said output connected to said second input of said EXCLUSIVE-OR gate.

8. The apparatus of claim 7, wherein:

said plurality of single-input gates of each of said third delay elements is greater in number and includes said single-input gates of the respective first delay element.

9. The apparatus of claim 7, wherein:

said plurality of single-input gates of each of said third delay elements is greater in number than that of each of said first delay elements and each of said third delay elements comprises at least two of said first delay elements.

10. Apparatus for receiving a binary digital signal which may have phase shifts, comprising:

a signal input for receiving a binary digital signal;

a plurality of n−1 first delay elements connected in series and forming a delay line including a plurality of taps for providing an undelayed binary digital signal and n−1 delayed binary signals, each of said first delay elements having a first predetermined delay interval;

a plurality of n pulse generators each including an input and an output, said input of one of said pulse generators connected to said signal input for receiving the undelayed binary digital signal, and the inputs of the other pulse generators each connected to a respective one of said taps for receiving respective delayed binary digital signals, said pulse generators respectively operable to generate pulses in response to said undelayed and delayed binary signals;

a clock generator operable to produce a clock having a frequency that is identical to or plesiochronic with the bit rate of the received binary digital signal and a phase difference which is arbitrary compared to the received binary digital signal;

a query pulse generator including an input connected to said clock generator and including an output, said query pulse generator operable to produce query pulses in response to the clock;

a plurality of n first NAND gates each including a plurality of inputs and an output, a first of said inputs connected to said output of a respective pulse generator and a second of said inputs connected to said output of said query pulse generator;

a plurality of n second NAND gates each including a first input connected to said output of a respective first NAND gate, a second input connected to said output of an adjacent first NAND gate which is connected via a respective one of said pulse generators to a tap of said delay line which is subsequent in terms of delay of the binary digital signal with respect to the connection to said delay line of the pulse generator connected to said output of said respective first NAND gate, and an output;

a plurality of n first AND gates each including a first input connected to a respective tap of said delay line with one of said first AND gates having its first input connected to said signal input, a second input connected to said output of a respective second NAND gate, and an output;

an OR gate including a plurality of inputs each connected to said output of a respective first AND gate, and an output;

a second delay element having a second delay interval which is twice the delay of said first delay interval and including an input connected to said output of said query pulse generator, and an output;

a received digital signal output; and a D flip-flop including a D input connected to said output of said OR gate, a clock input connected to said output of said second delay element, and an output connected to said received digital signal output.

11. The apparatus of claim 10, and further comprising:

a NOR gate including a plurality of inputs each connected to said output of a respective pulse generator of approximately the first half of said n pulse generators with respect to the delay of said binary digital signal by said delay line and an output; and each of said first NAND gates whose first input is connected to one of the remaining approximately half of said n pulse generators including a third input connected to said output of said NOR gate to inhibit through connection to said OR gate.

12. The apparatus of claim 10, wherein each of said pulse generators comprises:

an EXCLUSIVE-OR gate including first and second inputs and an output, said first input constituting said input of said pulse generator and said output constituting said output of said pulse generator; and a third delay element having a third delay interval and including an input connected in common with said first input of said EXCLUSIVE-OR gate and an output connected to said second input of said EXCLUSIVE-OR gate.

13. The apparatus of claim 10, wherein said query pulse generator comprises:

a second AND gate including a non-inverting input constituting said input of said query pulse generator, an inverting input, and an output constituting said output of said query pulse generator; and a delay element including an input connected in common with said non-inverting input of said second AND gate, and an output connected to said inverting input of said second AND gate.

14. The apparatus of claim 10, wherein:

each of said first delay elements comprises a plurality of single-input gates connected in series; and each of said pulse generators comprises an EXCLUSIVE-OR gate including a first input constituting said input of said pulse generator, a second input, and an output constituting said output said pulse generator, and a third delay element including an input, and an output, and a plurality of serially-connected single-input gates connected between said input and said output, said input connected in common with said first input of said EXCLUSIVE-OR gate, and said output connected to said second input of said EXCLUSIVE-OR gate.

15. The apparatus of claim 10, wherein:

said plurality of single-input gates of each of said third delay elements is greater in number than and includes said single-input gates of the respective first delay element.

16. The apparatus of claim 10, wherein:

said plurality of single-input gates of each of said third delay elements is greater than that of a first delay element and each of said third delay elements comprises at least two of said first delay elements.

17. Apparatus for receiving a binary digital signal which may have phase shifts, comprising:

a signal input for receiving a binary digital signal;

a plurality of $n-1$ first delay elements connected in series and forming a delay line including a plurality of taps for providing an undelayed binary digital signal and $n-1$ delayed binary signals, each of said first delay elements having a first predetermined delay interval;

a clock generator operable to produce a clock having a frequency that is identical to or plesiochronic with the bit rate of the received binary digital signal and a phase difference which is arbitrary compared to the received binary digital signal;

a query pulse generator including an input connected to said clock generator and including an output, said query pulse generator operable to produce query pulses in response to the clock and comprising a first AND gate including a non-inverting input, an inverting input, and an output constituting said output of said query pulse generator, and a second delay element having a second predetermined delay interval and including an input connected in common with said non-inverting input of said first AND gate, and an output connected to said inverting input of said AND gate;

a plurality of n pulse generators each including an input and an output, said input of one of said pulse generators connected to said signal input for receiving the undelayed binary digital signal, and the inputs of the other pulse generators each connected to a respective one of said taps for receiving respective delayed binary digital signals, said pulse generators respectively operable to generate pulse in response to said undelayed and delayed binary signals, each of said pulse generators comprising an EXCLUSIVE-OR gate including first and second inputs and an output, said first input constituting said input of said pulse generator and said output constituting said output of said pulse generator, and a third delay element having a third delay interval and including an input connected in common with said first input of said EXCLUSIVE-OR gate and an output connected to said second input of said EXCLUSIVE-OR gate;

a plurality of n first NAND gates each including a plurality of inputs and an output, a first of said inputs connected to said output of a respective pulse generator and a second of said inputs connected to said output of said query pulse generator;

a plurality of n second NAND gates each including a first input connected to said output of a respective first NAND gate, a second input connected to said output of an adjacent first NAND gate which is connected via a respective one of said pulse generators to a tap of said delay line which is subsequent in terms of delay of the binary digital signal with respect to the connection to said delay line of the pulse generator connected to said output of said respective first NAND gate, and an output;

a plurality of n second AND gates each including a first input connected to a respective tap of said delay line with one of said second AND gates having its first input connected to said signal input, a second input connected to said output of a respective second NAND gate, and an output;

an OR gate including a plurality of inputs each connected to said output of a respective second AND gate, and an output;

a third delay element having a third delay interval which is twice the delay of said first delay interval and including an input connected to said output of said query pulse generator, and an output;

a received binary digital signal output; and a D flip-flop including a D input connected to said output of said OR gate, a clock input connected to said output of said third delay element, and an output connected to said received binary digital signal output.

18. The apparatus of claim 17, wherein:
each of said delay elements comprises at least one single-input gate.

19. The apparatus of claim 17, wherein:
each of said delay elements comprises a plurality of single-input gates connected in series.

* * * * *